United States Patent
Barragan et al.

(10) Patent No.: US 10,937,218 B2
(45) Date of Patent: Mar. 2, 2021

(54) LIVE CUBE PREVIEW ANIMATION

(71) Applicant: MICROSOFT TECHNOLOGY LICENSING, LLC, Redmond, WA (US)

(72) Inventors: Noe M. Barragan, Redmond, WA (US); Maria Muresan Cameron, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 16/459,248

(22) Filed: Jul. 1, 2019

(65) Prior Publication Data
US 2021/0005002 A1    Jan. 7, 2021

(51) Int. Cl.
*G06T 13/20* (2011.01)
*G06T 19/00* (2011.01)
*G06T 15/80* (2011.01)

(52) U.S. Cl.
CPC .............. *G06T 13/20* (2013.01); *G06T 15/80* (2013.01); *G06T 19/006* (2013.01); *G06T 2210/21* (2013.01)

(58) Field of Classification Search
CPC ....... G06T 13/20; G06T 15/80; G06T 19/006; G06T 2210/21
See application file for complete search history.

(56) References Cited

U.S. PATENT DOCUMENTS

| | | | |
|---|---|---|---|
| 7,403,880 B2 * | 7/2008 | Maille | G06T 17/05 703/2 |
| 7,427,996 B2 * | 9/2008 | Yonezawa | G06T 19/006 345/629 |
| 8,990,682 B1 * | 3/2015 | Wong | G06T 19/006 715/254 |
| 9,041,622 B2 * | 5/2015 | McCulloch | G06F 3/013 345/7 |
| 9,330,478 B2 * | 5/2016 | Anderson | G06F 3/04842 |
| 9,741,145 B2 * | 8/2017 | Mitchell | G06T 13/20 |
| 9,754,167 B1 * | 9/2017 | Holz | G06K 9/00355 |
| 10,081,104 B1 * | 9/2018 | Swilling | B62D 57/032 |
| 10,139,899 B1 * | 11/2018 | Niemeyer | G06F 3/014 |

(Continued)

FOREIGN PATENT DOCUMENTS

EP    2680230 A2    1/2014

OTHER PUBLICATIONS

"International Search Report and Written Opinion Issued in PCT Application No. PCT/US20/034112", dated Sep. 4, 2020, 13 Pages.

*Primary Examiner* — Charles L Beard
(74) *Attorney, Agent, or Firm* — Workman Nydegger (57) ABSTRACT

Rendering potential collisions between virtual objects and physical objects if animations are implemented. A method includes receiving user input selecting a virtual object to be animated. The method further includes receiving user input selecting an animation path for the virtual object. The method further includes receiving user input placing the virtual object to be animated and the animation path in an environment including physical objects. The method further includes, prior to animating the virtual object, displaying the virtual object and the animation path in a fashion that shows the interaction of the virtual object with one or more physical objects in the environment.

20 Claims, 9 Drawing Sheets

(56) References Cited

U.S. PATENT DOCUMENTS

| | | | |
|---|---|---|---|
| 10,339,721 B1* | 7/2019 | Dascola | G06F 1/1643 |
| 10,535,199 B1* | 1/2020 | Bond | G06T 15/08 |
| 10,627,635 B2* | 4/2020 | Kiemele | G02B 27/0172 |
| 10,692,294 B1* | 6/2020 | Yeh | A63F 13/355 |
| 10,776,954 B2* | 9/2020 | Bleyer | G06F 3/012 |
| 2003/0077556 A1* | 4/2003 | French | A63B 69/0053 |
| | | | 434/258 |
| 2008/0186312 A1* | 8/2008 | Ahn | G06T 17/00 |
| | | | 345/420 |
| 2011/0140994 A1* | 6/2011 | Noma | G02B 27/017 |
| | | | 345/8 |
| 2012/0113223 A1* | 5/2012 | Hilliges | G06F 3/00 |
| | | | 348/46 |
| 2012/0142415 A1* | 6/2012 | Lindsay | H04N 5/2224 |
| | | | 463/33 |
| 2012/0168240 A1* | 7/2012 | Wilson | G05D 1/0011 |
| | | | 180/167 |
| 2012/0249443 A1* | 10/2012 | Anderson | G06F 3/04883 |
| | | | 345/173 |
| 2013/0215109 A1* | 8/2013 | Miesnieks | G06T 19/006 |
| | | | 345/419 |
| 2013/0215230 A1* | 8/2013 | Miesnieks | G06T 19/006 |
| | | | 348/46 |
| 2013/0218461 A1* | 8/2013 | Naimark | G01C 21/165 |
| | | | 701/505 |
| 2013/0286004 A1* | 10/2013 | McCulloch | G06T 19/006 |
| | | | 345/419 |
| 2013/0307875 A1* | 11/2013 | Anderson | G06T 19/006 |
| | | | 345/633 |
| 2013/0311153 A1* | 11/2013 | Moughler | E02F 9/205 |
| | | | 703/6 |
| 2013/0335301 A1* | 12/2013 | Wong | G06F 3/013 |
| | | | 345/8 |
| 2013/0342564 A1* | 12/2013 | Kinnebrew | G02B 27/017 |
| | | | 345/619 |
| 2014/0002493 A1* | 1/2014 | Mitchell | A63F 13/25 |
| | | | 345/633 |
| 2014/0157122 A1* | 6/2014 | Matsuo | G06F 3/0484 |
| | | | 715/702 |
| 2014/0300562 A1* | 10/2014 | Tanaka | G06F 3/016 |
| | | | 345/173 |
| 2015/0193986 A1* | 7/2015 | Nistel | G06T 15/04 |
| | | | 345/426 |
| 2016/0033770 A1* | 2/2016 | Fujimaki | H04N 13/344 |
| | | | 345/8 |
| 2016/0253844 A1* | 9/2016 | Petrovskaya | G06Q 50/01 |
| | | | 345/633 |
| 2016/0313790 A1* | 10/2016 | Clement | G02B 27/0093 |
| 2017/0059871 A1* | 3/2017 | Hashiba | A63F 13/25 |
| 2017/0061696 A1* | 3/2017 | Li | G02B 27/017 |
| 2017/0069134 A1* | 3/2017 | Shapira | G06F 3/011 |
| 2017/0270715 A1 | 9/2017 | Lindsay et al. | |
| 2017/0324841 A1* | 11/2017 | Clement | H04L 67/38 |
| 2017/0347979 A1* | 12/2017 | Fehre | G16H 40/67 |
| 2018/0005429 A1* | 1/2018 | Osman | G06T 15/20 |
| 2018/0024623 A1* | 1/2018 | Faaborg | G06F 3/0304 |
| | | | 345/156 |
| 2018/0060333 A1* | 3/2018 | Bosch | G06F 3/04815 |
| 2018/0074332 A1* | 3/2018 | Li | G06F 3/012 |
| 2018/0114365 A1* | 4/2018 | Egri | G06T 19/20 |
| 2018/0122043 A1 | 5/2018 | Energin et al. | |
| 2018/0162394 A1* | 6/2018 | Kamiya | G06K 9/00805 |
| 2018/0190027 A1* | 7/2018 | Yao | G06T 19/006 |
| 2018/0214777 A1* | 8/2018 | Hingorani | A63F 13/46 |
| 2018/0276891 A1* | 9/2018 | Craner | G06T 19/20 |
| 2018/0288391 A1* | 10/2018 | Lee | G06F 3/041 |
| 2018/0321737 A1* | 11/2018 | Pahud | G06F 3/0346 |
| 2018/0326286 A1* | 11/2018 | Rathi | A63B 22/20 |
| 2018/0349690 A1* | 12/2018 | Rhee | G06T 19/006 |
| 2018/0374264 A1* | 12/2018 | Gatson | G01S 15/87 |
| 2019/0005735 A1* | 1/2019 | Ronngren | G06F 3/011 |
| 2019/0011999 A1* | 1/2019 | Beach | G06T 19/003 |
| 2019/0033989 A1* | 1/2019 | Wang | G06F 3/0346 |
| 2019/0035124 A1* | 1/2019 | Kapinos | G06T 11/60 |
| 2019/0043214 A1* | 2/2019 | Chilcote-Bacco | G06T 19/00 |
| 2019/0043259 A1* | 2/2019 | Wang | G06F 3/04815 |
| 2019/0077019 A1* | 3/2019 | Hickman | G05D 1/0221 |
| 2019/0130644 A1* | 5/2019 | Mate | G06T 19/006 |
| 2019/0179509 A1* | 6/2019 | Daie | G06F 3/0485 |
| 2019/0202055 A1* | 7/2019 | Wang | B25J 9/1671 |
| 2019/0221043 A1* | 7/2019 | Kopper | G06F 3/014 |
| 2019/0227312 A1* | 7/2019 | Lai | G06K 9/00671 |
| 2019/0325763 A1* | 10/2019 | Hux | A63F 13/5255 |
| 2019/0333320 A1* | 10/2019 | Froy | G07F 17/3211 |
| 2019/0371072 A1* | 12/2019 | Lindberg | G06T 19/006 |
| 2019/0385379 A1* | 12/2019 | Woo | G06F 3/011 |
| 2020/0122327 A1* | 4/2020 | Hazan | B25J 13/06 |
| 2020/0206597 A1* | 7/2020 | Lee | G06K 9/00771 |
| 2020/0324196 A1* | 10/2020 | Nakamura | A63F 13/2145 |

\* cited by examiner

LIVE CUBE PREVIEW ANIMATION

BACKGROUND

Background and Relevant Art

Computing systems have been implemented which provide virtual reality, augmented reality, and/or mixed reality. In a virtual reality system, a user is placed into a virtual environment where the user can interact with the virtual environment, including interacting with virtual objects in the virtual environment. In a mixed or augmented reality system, an actual environment is augmented with virtual objects. That is, the user interacts with the actual environment (which includes physical objects) that the user is present in, but is also presented with virtual objects that the user can interact with. As used herein, a mixed reality system is any system that mixes virtual objects with actual physical objects.

Mixed reality systems often use a head mounted display (HMD) which allows the user to view the actual environment, but which also includes functionality for displaying virtual objects to the user in the actual environment. This is often accomplished by having sensors in the HMD that are able to sense characteristics of the actual environment (including sensing physical objects in the actual environment), sense user movements, and then based on the sensed characteristics of the actual environment and the sensed user movement, display virtual objects in the actual environment to the user. For example, a mixed reality system may be able to sense a table in an actual environment. The mixed reality system can also detect that a user using a mixed reality system is facing the table. The mixed reality system can cause a virtual object to be displayed to the user on the table. The user can perform various gestures to interact with the virtual object on the table. For example, the user could "pick-up" the virtual object, "move" the virtual object, view different perspectives of the virtual object, etc.

One of the important goals of an HMD is that the HMD provide a user experience that is as natural and realistic as possible. However, current systems have a flaw in that user introduced objects and animation conflict with physical objects in the actual environment. In particular, a user can select a virtual object and select an animation for the virtual object within the mixed reality environment. The user then activates the animation. However, novice users may place the virtual object in the environment in such a way, that when animated, the virtual object interacts with actual objects in unrealistic ways. For example, a virtual planet may be selected along with an orbit animation. The orbit animation may have a radius that causes the virtual ball to pass through a wall. This can be jarring to the user and/or destroy the sense of reality for the user.

The subject matter claimed herein is not limited to embodiments that solve any disadvantages or that operate only in environments such as those described above. Rather, this background is only provided to illustrate one exemplary technology area where some embodiments described herein may be practiced.

One embodiment illustrated herein includes a method that may be practiced in a mixed reality environment where virtual objects are implemented in the context of physical objects. The method includes acts for rendering potential collisions between virtual objects and physical objects if animations are implemented. The method includes receiving user input selecting a virtual object to be animated. The method further includes receiving user input selecting an animation path for the virtual object. The method further includes receiving user input placing the virtual object to be animated and the animation path in an environment including physical objects. The method further includes, prior to animating the virtual object, displaying the virtual object and the animation path in a fashion that shows the interaction of the virtual object with one or more physical objects in the environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein allow a user to select a virtual object and to select an animation path for placement in a mixed reality environment. Embodiments can display the virtual object in combination with the animation path (without actually animating the object) to illustrate how the object will be animated with respect to actual objects in the mixed reality environment. In particular, a user will be able to see if the animation path moves through an actual object such that interaction of a virtual object with the actual object will seem unrealistic. Thus, a technical problem exists where virtual objects are animated in mixed reality environments in unrealistic ways. This problem can be solved though a technical means of providing feedback to the user, such as visually rendered feedback using displays of devices, to show the user where collisions might occur to allow the user to interact with user input devices to change how objects will be animated in the virtual reality environment.

Figure 1:
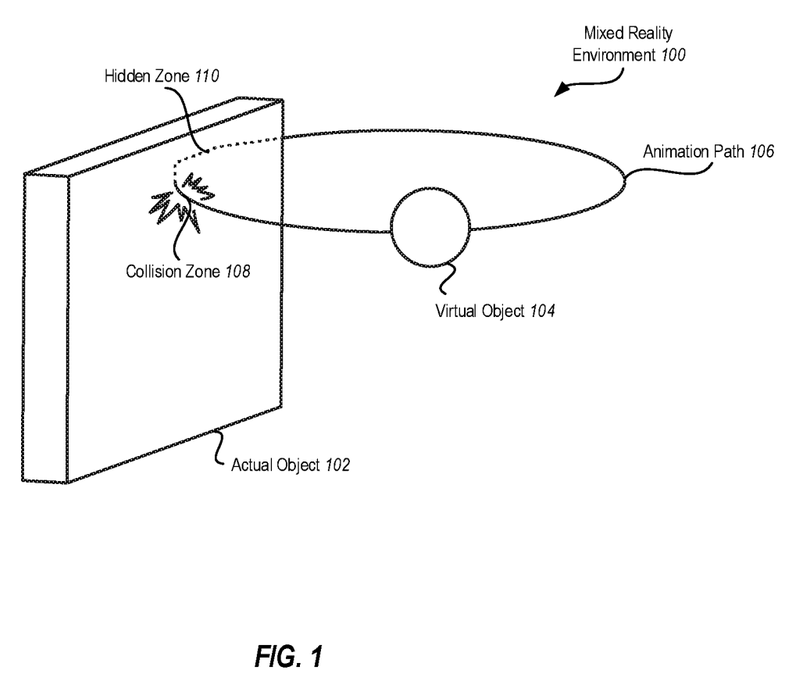
FIG. 1 illustrates a virtual object and animation path rendered in a mixed reality environment to show potential collisions with actual objects in the mixed reality environment.

For example, attention is directed to FIG. 1 which illustrates a mixed reality environment 100. The mixed reality environment includes an actual object 102 which in this example is a wall. A user may have selected a virtual object 104 for animation in the mixed reality environment 100. In the illustrated example, the virtual object 104 is a sphere. The user may have also selected an animation path 106 defining a path in the mixed reality environment 100 in which the virtual object 104 will be animated. In particular, a user can use various controllers and head mounted display (HMD) devices to select virtual objects and animation paths to be rendered as shown in FIG. 1 in a mixed reality environment 100. The user can use the controllers to place the virtual object 104 in a particular location in the mixed reality environment 100. The animation path 106 is associated with the virtual object 104 based on the selected location of the virtual object 104.

As illustrated in FIG. 1, the virtual object 104 will collide with the actual object 102. If the virtual object 104 is animated using the animation path 106 as placed in the mixed reality environment 100, the virtual object 104 will pass through the actual object 102. In many circumstances, this will be jarring to the user, and upset any perceptions of reality of the mixed reality environment 100. In particular, this may appear as if a solid object is passing through another solid object.

Figure 2:
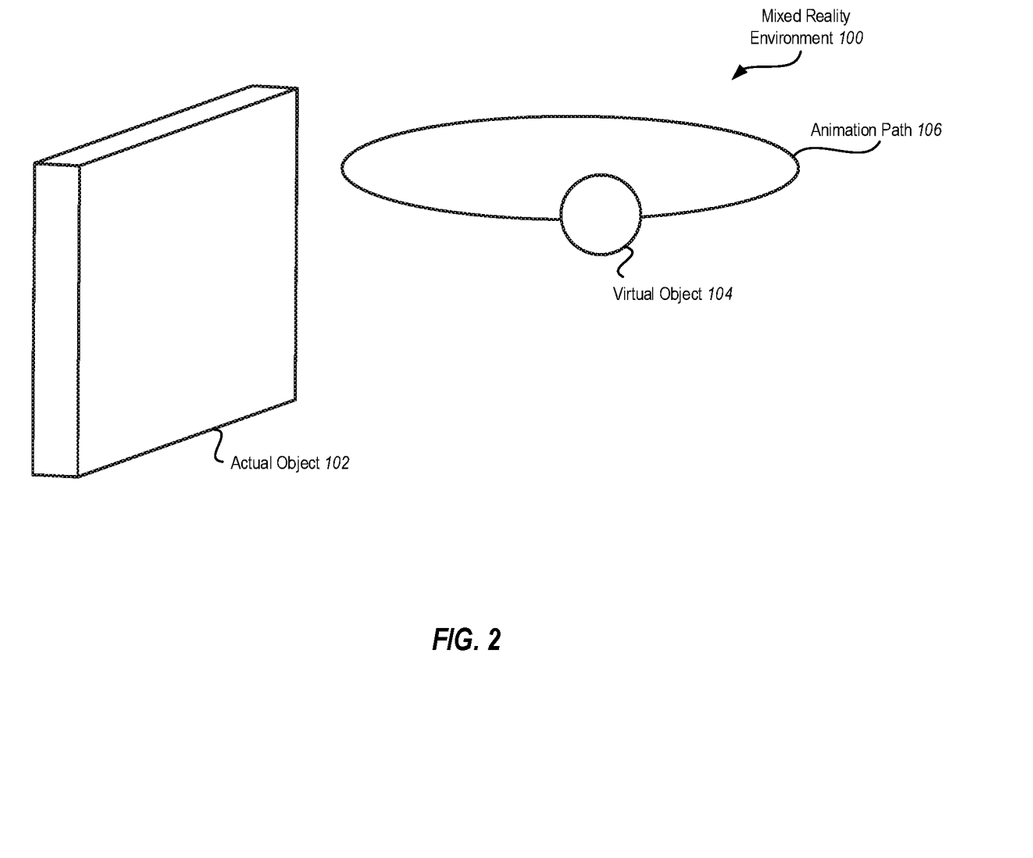
FIG. 2 illustrates a virtual object and animation path rendered in a mixed reality environment to show avoidance of collisions with actual objects in the mixed reality environment.

Embodiments illustrated herein can allow the user to determine that such an effect will occur. In particular, the animation path 106 is shown passing through the actual object 102, without the object being actually animated. Thus, a user can see the animation path 106 passing through the actual object 102 and move the virtual object 104 to avoid collision of the virtual object 104 with the actual object 102 when the animation associated with the animation path 106 is started. In this way, the user can have control so as to implement a realistic animation scenario. For example, as illustrated in FIG. 2 the virtual object 104 and the animation path 106 are moved away from the actual object 102 such that the virtual object 104 will not collide with the actual object 102.

Returning once again to FIG. 1, various techniques can be used to illustrate to a user collision of a virtual object 104 with an actual object 102.

Note that as will be described in more detail below, embodiments may include sensors that are able to detect and map the location of actual objects in the mixed reality environment 100. In particular, embodiments can use various depths sensors such as infrared emitters and detectors, stereoscopic cameras, ultrasonic emitters and detectors, combinations thereof, etc. For example, embodiments may be able to admit light signals from an HMD which are reflected off of the surfaces of actual objects in the mixed reality environment. Embodiments can measure Doppler shifts, phase shifts, light absorption, and other effects to determine various characteristics about object actual objects in the mixed reality environment 100. In particular, movement of objects may be detected, surface types of objects can be detected, locations can be detected, color (or at least shading) can be detected, etc.

In particular, optical tracking has become a useful and ubiquitous process. In some optical tracking systems, such as time-of-flight cameras, optical tracking involves a transmitter emitting optical signals, such as infrared or laser signals, directed at objects, capturing reflected optical signals, and using the captured, reflected signals, to track various objects. For example, optical tracking may be used to sense distances of objects in an environment. Using dual optical trackers can be useful for 3-D tracking.

This optical tracking may be used for a number of different purposes. For example, optical trackers may be implemented on head mounted displays (HMDs) used in mixed reality or virtual reality. The optical trackers in these scenarios may be used to track locations of objects in an environment with respect to the HMD. This may be useful to help a user avoid and/or locate physical object in a room. Also, this can be used to sense movement over time of the user's head. In other words, such optical tracking may be used to perform head tracking (HeT) operations, which are useful in providing a rich and realistic mixed reality or virtual reality experience by presenting virtual objects to a user based on the user's head movements.

By knowing the location of actual objects in the mixed reality environment 100, embodiments can render for a user, anticipated collisions between virtual objects and actual objects in the mixed reality environment 100 when an animation is performed. Thus, for example, in the example illustrated in FIG. 1, a device such as an HMD can display to a user a rendering of the virtual object 104 along with the animation path 106. FIG. 1 illustrates a collision zone 108. In particular, a device can display an appropriate visual indication of a potential collision if the virtual object 104 is animated according to the animation path 106 in the mixed reality environment 100. In the example illustrated in FIG. 1, the collision zone 108 is illustrated with impact lines that are rendered on a display, such as an HMD display or other device display. However, it should be appreciated that in other environments other illustrations may be provided on a display. For example, portions of the animation path 106 that do not cause the virtual object 104 to collide with the actual object 102 may be rendered using a color code, such as a green shading for those portions of the animation path 106. Portions of the animation path in the collision zone 108 may be rendered as shaded with a different coloring, such as for example a red shading, indicating that the virtual object 104 will collide with the actual object 102 along this portion of the animation path 106.

FIG. 1 further illustrates a hidden zone 110. The hidden zone 110 may be rendered by a device such as an HMD to illustrate portions of the animation path 106 where the virtual object 104 will be partially or completely hidden from view by the actual object 102. In FIG. 1, the hidden zone 110 is illustrated as being rendered by a device as a set of dotted lines. Although, it should be appreciated that other illustrations may be rendered alternatively or additionally.

Note that in some embodiments, a user may intend for a virtual object to collide with an actual object. For example, consider a case illustrated in FIG. 3. In this example, a science teacher may wish to teach her students about the operation of various organs in the context of the students in a mixed reality environment 300. Thus, in the present example, the actual object 302 is a person. The virtual object 304 is a human heart. The animation path 306 is a lateral movement back and forth of the human heart 304. The user may wish to cause an animation where the virtual object 304 emerges from the actual object 302 along the animation path 306. Given that embodiments can render the animation path 306 along with the virtual object 304, the user can position the virtual object 304 and the animation path 306 to achieve the desired effect. Thus, in the illustrated example, the teacher can create for the student an immersive experience that is more compelling than what might be otherwise available.

Note that in some embodiments, two or more different devices, such as two or more different HMD devices and associated controllers may be used in concert to create certain experiences. In particular, various devices can be networked such that an experience in a mixed reality environment can be created by a user of a first HMD device and experienced by other users with different HMD devices. For example, in the example illustrated in FIG. 3 the teacher may use the HMD device 312-1 and the controllers 314-1-R and 314-1-L. These can be used to place the virtual object 304 and the animation path 306 in a particular location in the mixed reality environment 300 that interacts with the actual object 302 in a fashion desired by the user of the HMD 312-1 and controllers 314-1-R and 314-1-L. The teacher can then activate the animation once the virtual object 304 and animation path 306 are placed in an appropriate location. The animation can then be perceived by users of other HMD devices. For example, in FIG. 3 the actual object 302 may be another user wearing an HMD 312-2. In this way the user, i.e. the actual object 302, can experience an immersive and rich experience so as to perceive how their actual body is organized and functions.

Figure 3:
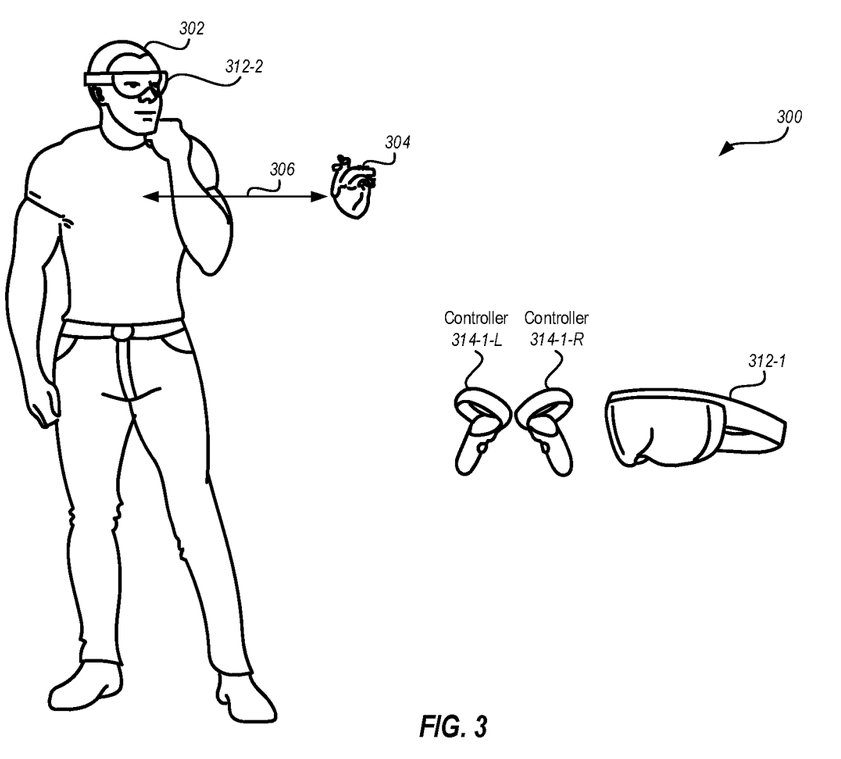
FIG. 3 illustrates an example of rendering a virtual object and an animation path with an intended collision with an actual object in a mixed reality environment.

Note that some embodiments allow for tracking of movement of actual objects in the virtual reality environment. Virtual object placement and animation may be anchored to these actual objects. Thus, for example, the virtual object 304 and animation path 306 may be anchored to the actual object 302, such that when the actual object 302 moves in the mixed reality environment 300, the virtual object 304 and animation path 306 will move in the mixed reality environment. Note that in some circumstances, the animation path will be rendered to allow the user to see the path without the need for animation of the virtual object, whereas in other circumstances the animation path will be un-rendered, such as when the virtual object is animated according to the animation path. Note however that in some circumstances the virtual object can be animated with the animation path rendered.

Figure 4:
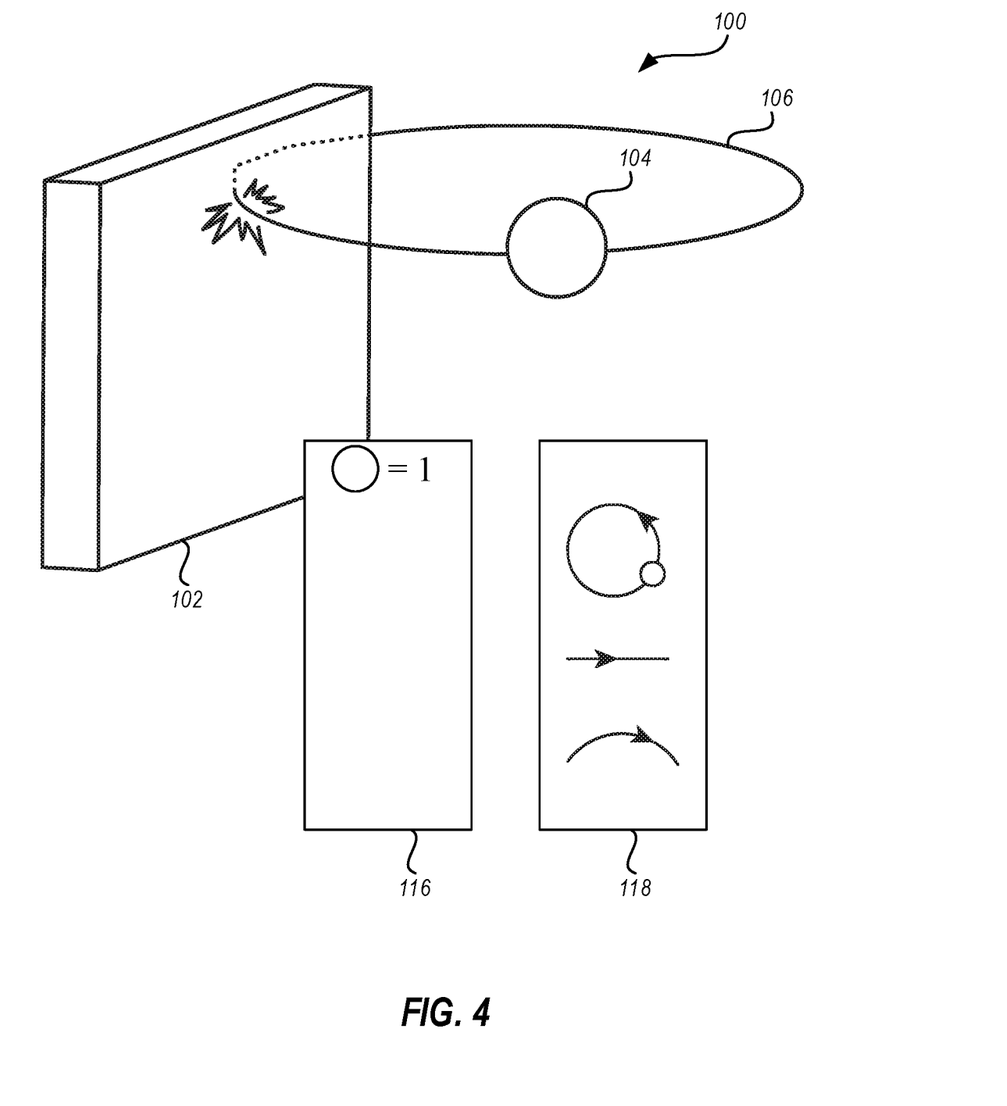
FIG. 4 illustrates rendering suggested remedies in drop down boxes for potential collisions.

Some embodiments may include interactive functionality that provides suggestions to a user for changes in either or both a virtual object and/or an animation path. For example, attention is now directed to FIG. 4 which illustrates an alternative state of the mixed reality environment 100. In this example, an HMD or other device can display to a user various suggestions for changes to the virtual object 104 and/or the animation path 106. In particular, FIG. 4 illustrates a drop down box 116 for the virtual object 104 and a drop down box 118 for the animation path 106. The drop down boxes 116 and 118 provide suggestions for modifications to the virtual object 104 and/or the animation path 106. For example, the drop-down box 116 may provide a recommendation that the size of the virtual object 104 be reduced if such reduction will prevent collision with the actual object 102 in the mixed reality environment.

In some embodiments, different textures of objects may be recommended. For example, in some embodiments if a potential collision is detected, embodiments can suggest objects and/or textures of objects that are not as jarring to the user to still allow the particular virtual object to collide with the actual object 102. For example, embodiments may suggest that the object be at least partially transparent which provides an ethereal quality to the virtual object 104 which mitigates the jarring effects of the object 104 passing through an actual object 102. Alternatively or additionally, different types of objects may be suggested. For example, embodiments may suggest a cloud or other extremely low density object. This can reduce the jarring effects of the virtual object 104 passing through the actual object 102.

In yet another alternative embodiment, a device such as the HMD described previously herein may have information about the mixed reality environment 100 such that the device has mapped the mixed reality environment 100 behind the actual object 102 from the perspective of a user. In this fashion, the device can project elements of the mixed reality environment 100 onto the actual object 102 in a fashion that makes the actual object 102 appear somewhat transparent or ethereal. In this way, changes do not need to be made to the virtual object 104, but rather it will appear more natural for the virtual object 104 to pass through the actual object 102 as the actual object 102 appears to be extremely low density, transparent, and/or ethereal. This option may alternatively or additionally be presented to the user as an option for dealing with potential collisions as illustrated.

Figure 5:
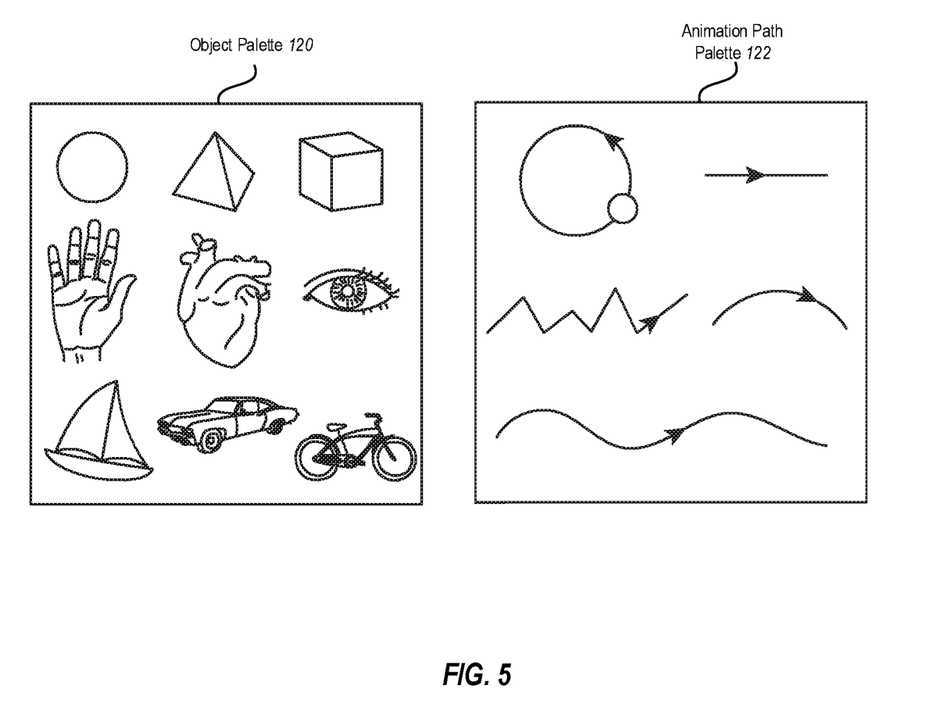
FIG. 5 illustrates rendering an object palette and an animation path palette.

Additional details are now illustrated. Referring now to FIG. 5, in some embodiments and HMD device or other device may be configured to project various palettes in the mixed reality environment to a user. For example, FIG. 5 illustrates an object palette 120 and an animation path palette 122. Here a user can use the HMD device and controllers to select an object from the object palette 120 and one or more animation paths from the animation path palette 122. These can be drug and dropped into the mixed reality environment 100 where the user can then be notified of potential collisions and perform various adjustments to mitigate collisions, or as in the case of the example illustrated in FIG. 3 properly implement desired collisions.

Alternatively, or additionally, the drop-down box 118 may recommend different animation paths and/or changes to the animation path 106 to show what changes to the animation path 106 or different animation paths would prevent a collision of the virtual object 104 with the actual object 102. For example, if the animation path 106 is an orbit, the drop-down box 118 may suggest an orbit with a smaller radius. Alternatively and/or additionally, the drop-down box 118 may suggest a different type of animation path that would prevent collision of the virtual object 104 with the actual object 102.

Figure 6:
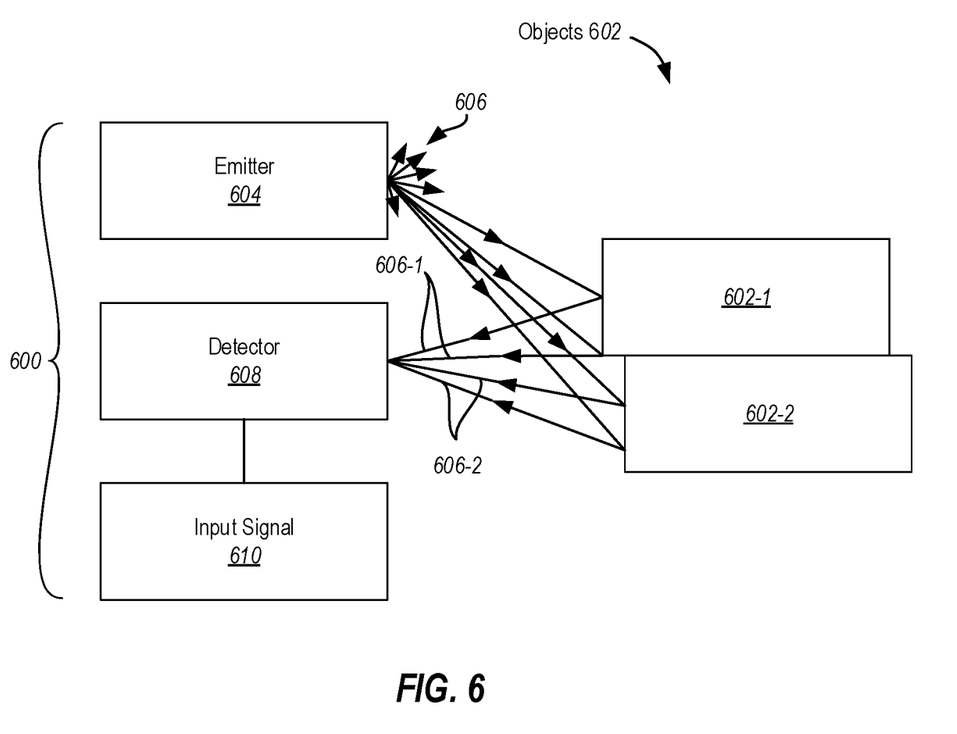
FIG. 6 illustrates emitter and detector hardware for locating objects in a mixed reality environment.

Embodiments can be configured, as described above, to detect actual objects in an environment. For example, in some embodiments system 600 is implemented, in whole or in part, as a time-of-flight camera system of a user device (e.g., a head-mounted display (HMD), gaming console, or other computer system) for tracking real-world objects in the vicinity of the user device. In some implementations, tracking real-world objects is useful for head tracking in HMDs (e.g., by detecting the edges or corners of real-world objects over time, a system can determine how the HMD has moved with respect to the real-world objects over time).

Continuing with FIG. 6, the system 600 illustrates a system that is able to use optical signals to detect distances from the system 600 (or any particular part of the system 600) to objects 602. The system 600 includes an emitter 604. In some embodiments, the emitter is implemented as one or more light emitting diodes (LEDs), laser diodes, and/or any other illumination unit which is suitable for emitting modulated light. The emitter 604 emits an optical signal 606. For example, the optical signal may be a set of laser pulses, infrared light pulses, or another appropriate optical signal. It will be appreciated that the emitter 604 can be configured to emit light at any desired wavelength or band of wavelengths (e.g., in the visible spectrum, near IR spectrum, IR spectrum, etc.).

As is evident in FIG. 6, optical signal 606 is emitted from emitter 604 in a plurality of directions, such that different portions of optical signal 606 reflect off of different objects 602 in the real-world environment of system 600. A first portion of the optical signal 606 reflects off of object 602-1, resulting in reflected optical signal 606-1, and a second portion of the optical signal 606 reflects off of object 602-2, resulting in reflected optical signal 606-2.

Both reflected optical signal 606-1 and reflected optical signal 606-2 are received by detector 608. The detector 608 may include, for example, various photodiodes, cameras, and/or other sensor hardware that is able to convert the reflected optical signals 606-1 and 606-2 to an input signal 610. In some instances, the detector 608 includes a plurality of pixels for detecting reflected optical signals 606-1 and 606-2. The input signal 610 is an electrical signal created by the detector 608 from the reflected optical signals 606-1 and 606-2. Various attributes of the reflected optical signals 606-1 and 606-2, such as the phase and the active brightness (e.g., an amount of intensity collected) can be determined from the input signal 610 received by the detector 608. By analyzing properties of the input signal 610 (e.g., compared with or correlated with the properties of the optical signal 606 initially emitted by emitter 604), system 600 can determine distance between system 600 and objects 602 (e.g., objects 602-1 and 602-2, which reflect reflected optical signals 606-1 and 606-2 toward detector 608). In some instances, the distance between system 600 and objects 602 is determined on a pixel-by-pixel basis (e.g., based on the detections of the various pixels of detector 608).

The reflected optical signals 606-1 and 606-2 will have a shifted phase and changed intensity based on travel to and from, and being reflected off of the objects 602-1 and 602-2, respectively, as compared to the original phase and intensity of the optical signal 606 when transmitted from the emitter 604. The change in phase is related to the distance the signal has traveled. In particular, phase is related to the distance traveled by $$\phi = \frac{4\pi d}{c} f,$$

where $\phi$ is the detected phase of the detected optical signal, d is the distanced traversed, f is the modulation frequency of the light, and c is the speed of the light. Thus, the total distance travelled is proportional to the phase of the signal received at the detector 608. The intensity of the signal received at the detector 608 will also depend on the distance traveled, in particular because the intensity is proportional to the distance traveled by an inverse square relationship.

It is noted that object 602-1 and 602-2 are at different positions with respect to system 600. In particular, object 602-2 is positioned further from system 600 than object 602-1. Accordingly, the path traversed by reflected optical signal 606-2 is longer than reflected optical signal 606-1. Thus, the detected phase and active brightness of the two reflected optical signals 606-1 and 606-2 will also be different.

Intensity also changes based on the color of the object reflecting the signal. For example, a dark object will absorb more (and reflect less) of the light and reduce the intensity more than a lighter-colored object. Accordingly, differences in color between object 602-1 and 602-1 (if there are differences) will affect the intensity of the reflected optical signals 606-1 and 606-2 received by detector 608.

As noted above, the change in phase and intensity can be used to determine the distance of the objects 602-1 and 602-2 from the system 600. This can be done by examination of the input signal 610, or other signals created from the input signal 610, as compared with the optical signal 606 as emitted by emitter 604.

Although objects 602-1 and 602-2 are shown as distinct objects, it will be appreciated that objects 602-1 and 602-2 can correspond to different parts of a single object. For example, objects 602-1 and 602-2 can correspond to different elements, textures, or portions of a single object or environment, each being positioned at a different distance from system 600. Also, it will be noted that objects 602 need not be thought of as having homogeneous features (e.g., color, texturing), and that differences in each individual object would be reflected in the phase and/or intensity of the reflected optical signals received by detector 608. For example, object 602-1 could have a dark portion and a bright portion, and each portion of object 602-1 would reflect a different intensity of light.

Those skilled in the art will recognize that, in some embodiments, emitter 604 is configured to simultaneously or sequentially emit an optical signal composed of different modulation frequencies (e.g., 2, 3, 4, or more different modulation frequencies), all of which may be reflected off of objects 602 to cause reflected optical signals which are detected by detector 608. Thus, a reflected optical signal can comprise various different modulation frequencies, and an input signal 610 can be generated based on some or all of the different modulation frequencies of the reflected optical signal.

Figure 7:
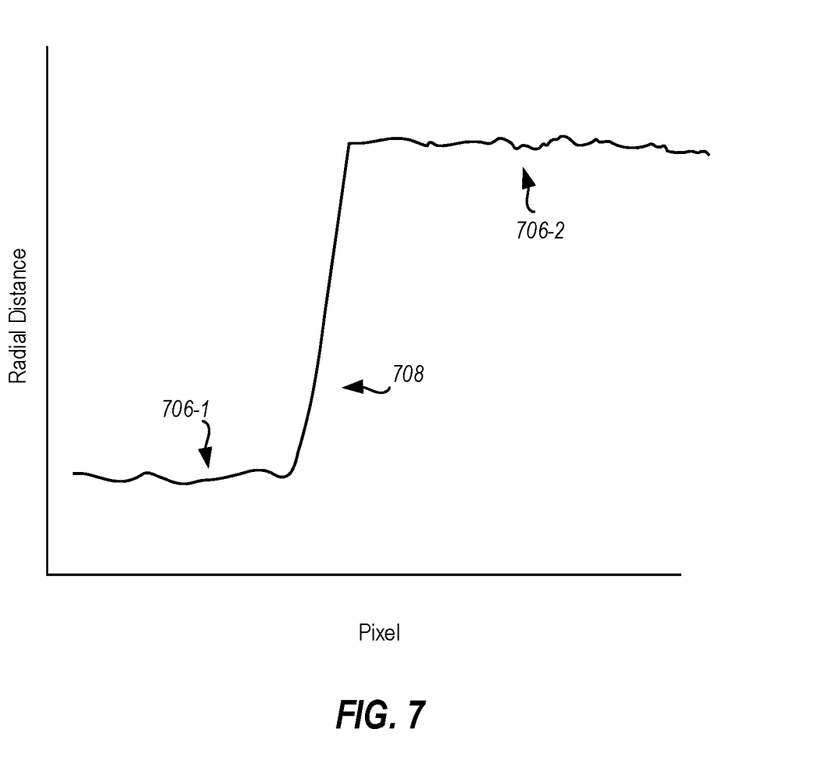
FIG. 7 illustrates signal analysis for identifying objects in a mixed reality environment.

FIG. 7 shows an exemplary input signal, which is a conceptual representation of input signal 610 described above with reference to FIG. 6. The input signal 610 is shown along a vertical axis indicating radial distance (e.g., distance between the system 600 and objects 602) and a horizontal axis indicating pixel (e.g., the different optical signal detection pixels of detector 608). In essence, the representation of input signal 610 shown in FIG. 7 demonstrates a profile of the objects 602-1 and 602-2, based on the reflected optical signals 606-1 and 606-2 received by detector 608.

For example, the input signal 610 is shown as having three regions: region 706-1, region 706-2, and region 708. Region 706-1 corresponds to the part of the input signal 610 that is based on the reflected optical signal 606-1, which was reflected off of object 602-1 toward detector 608. Similarly, region 706-2 corresponds to the part of the input signal 610 that is based on the reflected optical signal 606-2, which was reflected off of object 602-2 toward detector 608. Accordingly, region 706-1 indicates a nearer radial distance (e.g., distance from system 600), while region 706-2 indicates a further radial distance, since object 602-2 is situated further from system 600 than object 602-1.

Region 708 represents a transition region between region 706-1 and region 706-2. For example, region 708 corresponds to the part of input signal 610 that is based on optical reflections from the edge, or near the edge, of object 602-1. Put differently, region 708 corresponds to a real-world transition (or edge) between object 602-1 and 602-2, as detected by detector 608.

Using this functionality, location and movement of physical objects can be determined.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
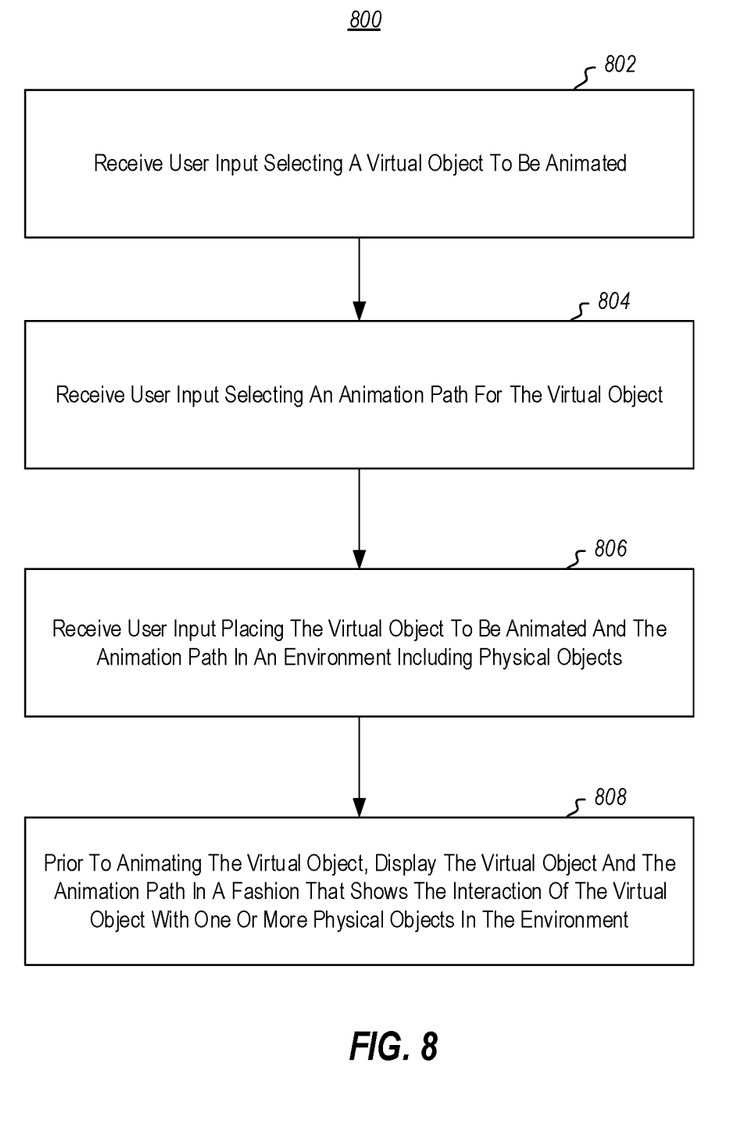
FIG. 8 illustrates a method of rendering potential collisions between virtual objects and physical objects if animations are implemented.

Referring now to FIG. 8, a method 800 is illustrated. The method 800 may be practiced in a mixed reality environment where virtual objects are implemented in the context of physical objects. The method includes acts for rendering potential collisions between virtual objects and physical objects if animations are implemented. The method includes receiving user input selecting a virtual object to be animated (act 802).

The method further includes receiving user input selecting an animation path for the virtual object (act 804).

The method further includes receiving user input placing the virtual object to be animated and the animation path in an environment including physical objects (act 806). For example, the virtual object 104 and animation path 106 may be selected by a user and placed in the mixed reality environment where they are rendered by a device, such as the HMD 302 shown in FIG. 3.

The method further includes prior to animating the virtual object, displaying the virtual object and the animation path in a fashion that shows the interaction of the virtual object with one or more physical objects in the environment (act 808). An example of this is illustrated in FIG. 1, where the collision zone 108 can be seen without needing to actually animate the virtual object 104.

The method 800 may further include detecting a potential collision between the virtual object and a physical object if the animation were performed and as a result, highlighting the potential collision. For example, the collision zone rendering illustrated in FIG. 1 may be performed.

In some embodiments, highlighting the collision includes color coding the animation path to show locations on the animation path where the potential collision occurs. Alternatively or additionally, highlighting the collision comprises displaying a potential collision indicator.

In some embodiments, the method 800 may further include detecting a potential collision between the virtual object and a physical object if the animation were performed and as a result, automatically providing one or more suggested remedial actions. An example of this is illustrated in FIG. 4, where alternate animation paths, objects, and/or object sizes are suggested. Thus, the method may be practiced where the one or more suggested remedial action comprises displaying alternate suggested animation paths. This could be different shapes, different sizes (e.g., shorter lengths, smaller radii, larger radii, etc.). Alternatively or additionally, the method may be practiced where the one or more suggested remedial action comprises displaying alternate suggested virtual objects. For example, different shapes and/or sizes could be suggested.

Figure 9:
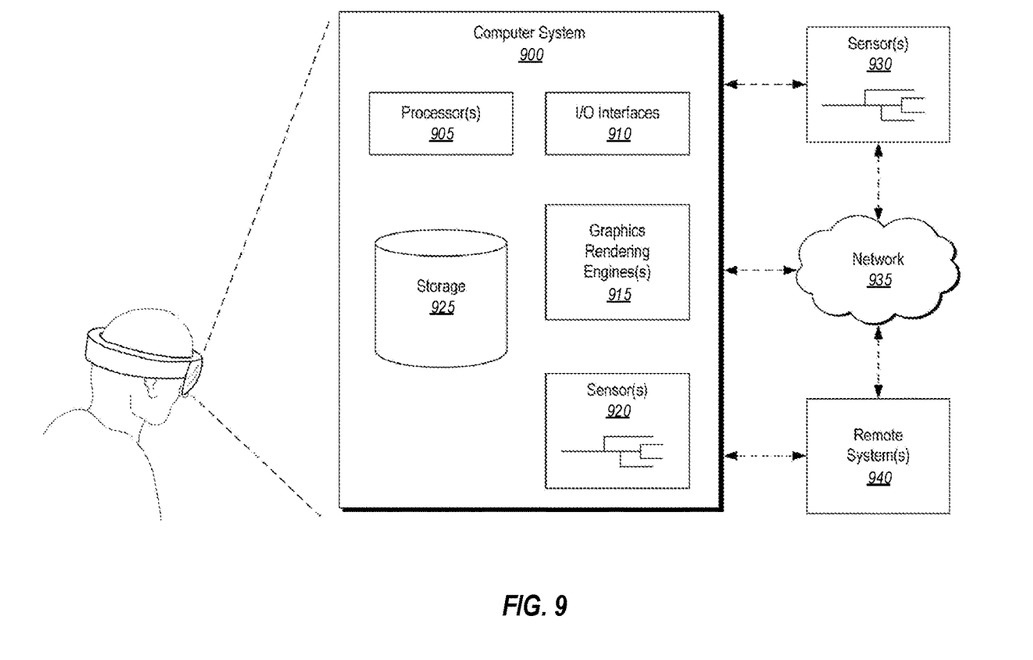
FIG. 9 illustrates a system where embodiments may be implemented.

Having just described the various features and functionalities of some of the disclosed embodiments, attention is now directed to FIG. 9, which illustrates an example computer system 900 that may be used to facilitate the operations described herein. It will be appreciated that, in some instances, the computer system 900 shown in FIG. 9 can be used to carry out the embodiments described herein. In particular, the system can display the various virtual objects, animation paths, menus, palettes, collision indicators, etc., as described above.

The computer system 900 may take various different forms. For example, in FIG. 9, the computer system 900 is embodied as a head-mounted display (HMD). Although the computer system 900 may be embodied as an HMD, the computer system 900 may also be a distributed system that includes one or more connected computing components/devices that are in communication with the HMD. Accordingly, the computer system 900 may be embodied in any form and is not limited strictly to the depiction illustrated in FIG. 9. By way of example, the computer system 900 may include a projector, desktop computer, a laptop, a tablet, a mobile phone, server, data center and/or any other computer system.

In its most basic configuration, the computer system 900 includes various different components. For example, FIG. 9 shows that computer system 900 includes at least one hardware processing unit 905 (aka a "processor"), input/output (I/O) interfaces 910, graphics rendering engines 915, one or more sensors 920, and storage 925. More detail on the hardware processing unit 905 will be presented momentarily.

The storage 925 may be physical system memory, which may be volatile, non-volatile, or some combination of the two. The term "memory" may also be used herein to refer to non-volatile mass storage such as physical storage media. If the computer system 900 is distributed, the processing, memory, and/or storage capability may be distributed as well. As used herein, the term "executable module," "executable component," or even "component" can refer to software objects, routines, or methods that may be executed on the computer system 900. The different components, modules, engines, and services described herein may be implemented as objects or processors that execute on the computer system 900 (e.g. as separate threads).

The disclosed embodiments may comprise or utilize a special-purpose or general-purpose computer including computer hardware, such as, for example, one or more processors (such the hardware processing unit 905) and system memory (such as storage 925), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 900 may also be connected (via a wired or wireless connection) to external sensors 930 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. For example, the sensors 920/930 can include an emitter 604 and/or a detector 608, as described hereinabove with reference to FIG. 6. Further, the computer system 900 may also be connected through one or more wired or wireless networks 935 to remote systems(s) 940 that are configured to perform any of the processing described with regard to computer system 900.

During use, a user of the computer system 900 is able to perceive information (e.g., a mixed-reality environment) through a display screen that is included among the I/O interface(s) 910 and that is visible to the user. The I/O interface(s) 910 may include the input elements described herein, which are linked to one or more underlying applications generating information for the mixed-reality scene.

The I/O interface(s) 910 and sensors 920/930 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 915 is configured, with the hardware processing unit 905, to render one or more virtual objects within the scene. As a result, the virtual objects accurately move in response to a movement of the user and/or in response to user input as the user interacts within the virtual scene.

A "network," like the network 935 shown in FIG. 9, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 900 will include one or more communication channels that are used to communicate with the network 935. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 905). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to render potential collisions between virtual objects and physical objects if animations are implemented, including instructions that are executable to configure the computer system to perform at least the following:
   receiving user input selecting a virtual object to be animated;
   receiving user input selecting an animation path for the virtual object;

receiving user input placing the virtual object to be animated and the animation path in an environment including physical objects;

detecting a potential collision between the virtual object and a physical object if the animation were performed; and prior to animating the virtual object, displaying the virtual object and the animation path in a fashion that shows the interaction of the virtual object with the physical object in the environment by highlighting a potential collision between the virtual object with the physical object.

2. The computer system of claim 1, wherein highlighting the collision comprises color coding the animation path to show locations on the animation path where the potential collision occurs.

3. The computer system of claim 1, wherein highlighting the collision comprises displaying a potential collision indicator.

4. The computer system of claim 1, wherein the one or more computer-readable media further have stored thereon instructions that are executable by the one or more processors to configure the computer system to perform at least the following:

as a result of detecting a potential collision between the virtual object and the physical object if the animation were performed, automatically providing one or more suggested remedial actions.

5. The computer system of claim 4, wherein automatically providing the one or more suggested remedial actions comprises displaying alternate suggested animation paths.

6. The computer system of claim 4, wherein automatically providing the one or more suggested remedial actions comprises displaying alternate suggested virtual objects.

7. In a mixed reality environment where virtual objects are implemented in the context of physical objects, a method of rendering potential collisions between virtual objects and physical objects if animations are implemented, the method comprising:

receiving user input selecting a virtual object to be animated;

receiving user input selecting an animation path for the virtual object;

receiving user input placing the virtual object to be animated and the animation path in an environment including physical objects;

detecting a potential collision between the virtual object and a physical object if the animation were performed; and prior to animating the virtual object, displaying the virtual object and the animation path in a fashion that shows the interaction of the virtual object with the physical object in the environment by highlighting a potential collision between the virtual object with the physical object.

8. The method of claim 7, wherein highlighting the collision comprises color coding the animation path to show locations on the animation path where the potential collision occurs.

9. The method of claim 7, wherein highlighting the collision comprises displaying a potential collision indicator.

10. The method of claim 7, further comprising:

as a result of detecting a potential collision between the virtual object and the physical object if the animation were performed, automatically providing one or more suggested remedial actions.

11. The method of claim 10, wherein automatically providing the one or more suggested remedial actions comprises displaying alternate suggested animation paths.

12. The method of claim 10, wherein automatically providing the one or more suggested remedial actions comprises displaying alternate suggested virtual objects.

13. The method of claim 7, wherein automatically providing the one or more suggested remedial actions comprises displaying an alternate type of animation path.

14. The method of claim 7, wherein automatically providing the one or more suggested remedial actions comprises displaying an alternate size of animation path.

15. A physical computer readable storage medium having stored thereon instructions that are executable by one or more processors to configure a computer system to render potential collisions between virtual objects and physical objects if animations are implemented, including instructions that are executable to configure the computer system to perform at least the following:

receiving user input selecting a virtual object to be animated;

receiving user input selecting an animation path for the virtual object;

receiving user input placing the virtual object to be animated and the animation path in an environment including physical objects;

detecting a potential collision between the virtual object and a physical object if the animation were performed; and prior to animating the virtual object, displaying the virtual object and the animation path in a fashion that shows the interaction of the virtual object with the physical object in the environment by highlighting a potential collision between the virtual object with the physical object.

16. The computer system of claim 15, wherein highlighting the collision comprises color coding the animation path to show locations on the animation path where the potential collision occurs.

17. The computer system of claim 15, wherein highlighting the collision comprises displaying a potential collision indicator.

18. The computer readable storage medium of claim 15, further having stored thereon instructions that are executable by the one or more processors to configure the computer system to perform at least the following:

as a result of detecting a potential collision between the virtual object and the physical object if the animation were performed, automatically providing one or more suggested remedial actions.

19. The computer readable storage medium of claim 18, wherein automatically providing the one or more suggested remedial actions comprises displaying alternate suggested animation paths.

20. The computer readable storage medium of claim 18, wherein automatically providing the one or more suggested remedial actions comprises displaying alternate suggested virtual objects.

* * * * *